(12) United States Patent
Crucian et al.

(10) Patent No.: US 8,335,712 B1
(45) Date of Patent: Dec. 18, 2012

(54) MINIMIZING AD PRODUCTION COSTS FOR PRINT ADVERTISERS

(75) Inventors: Nicolae Crucian, New York, NY (US); Isaac Taylor, Mountain View, CA (US)

(73) Assignee: Google Inc., Mountain View, CA (US)

( * ) Notice: Subject to any disclaimer, the term of this patent is extended or adjusted under 35 U.S.C. 154(b) by 176 days.

(21) Appl. No.: 12/621,943

(22) Filed: Nov. 19, 2009

Related U.S. Application Data

(60) Provisional application No. 61/167,100, filed on Apr. 6, 2009.

(51) Int. Cl.
*G06Q 30/00* (2012.01)
(52) U.S. Cl. ..................................................... 705/14.1
(58) Field of Classification Search ................... 705/14.1
See application file for complete search history.

(56) References Cited

U.S. PATENT DOCUMENTS

| | | | |
|---|---|---|---|
| 5,666,493 A | 9/1997 | Wojcik et al. | |
| 6,026,368 A | 2/2000 | Brown et al. | |
| 6,167,382 A | 12/2000 | Sparks et al. | |
| 6,401,075 B1 | 6/2002 | Mason et al. | |
| 6,985,882 B1 | 1/2006 | Del Sesto | |
| 2008/0306815 A1* | 12/2008 | Dykes et al. | 705/14 |
| 2009/0012905 A1* | 1/2009 | Mawani et al. | 705/80 |

FOREIGN PATENT DOCUMENTS

WO    WO 97/21183    6/1997

OTHER PUBLICATIONS

AdForce, Inc., User Guide: A Complete Guide to AdForce, Version 2.6, 1998.
AdForce, Inc. S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www.archive.org, Apr. 12, 1997 and Feb. 1, 1997.
Baseview Products, Inc., AdManagerPro Administration Manual v. 2.0, Dec. 1998.
Baseview Products, Inc., ClassManagerPro Administration Manual v. 1.0.5, Feb. 1, 1997.
Business Wire, "Global Network, Inc. Enters Into Agreement in Principle With Major Advertising Agency," Oct. 4, 1999.
Information Access Technologies, Inc., Aaddzz brochure, "The Best Way to Buy and Sell Web Advertising Space," © 1997.
Information Access Technologies, Inc., Aaddzz.com website archive from www.archive.org, archived on Jan. 30, 1998.
Robbin Zeff and Brad Aronson, Advertising on the Internet, John Wiley & Sons, 1997.
Robbin Zeff and Brad Aronson, Advertising on the Internet, 2nd Ed., John Wiley & Sons, 1999.

\* cited by examiner

*Primary Examiner* — Daniel Lastra
(74) *Attorney, Agent, or Firm* — Fish & Richardson P.C.

(57) ABSTRACT

Methods, systems, and apparatus, including computer programs encoded on computer storage media, for minimizing ad production costs for print advertisers. In one aspect, a method includes receiving parameters associated with one or more publications; receiving input defining one or more ads; grouping the one or more publications based on the received parameters to form a plurality of groups, wherein a quantity of groups in the plurality of groups is based on the received input; determining an optimal ad space size for each of the plurality of groups; and generating the one or more ads, wherein each ad is defined by the optimal ad space size of one or more of the plurality of groups.

18 Claims, 7 Drawing Sheets

Option #1
Please input the total number of unique ads that you would like to include in this ad campaign:
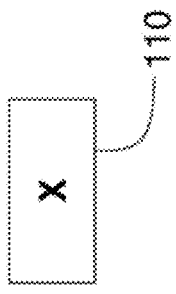
110
*Please note: A smaller number of unique ads in the campaign results in a increased deviation percentage for each ad as compared to the booked ad size.
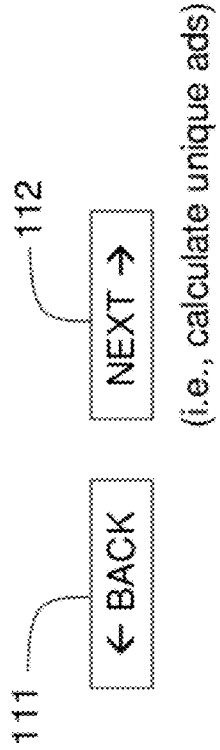
111 ← BACK
NEXT → 112
(i.e., calculate unique ads)
FIG. 1b

FIG. 1c

Option #2

Please input the maximum deviation percentage allowable for any single ad as compared to the booked ad size (i.e., 10% deviation from booked ad size would be acceptable)

[ % deviation from booked ad size ] — 122

Alternatives:
1. Maximum height deviation    (i.e., disregard aspect ratio)
2. Maximum width deviation     (i.e., disregard aspect ratio)
3. Maximum diagonal deviation  (i.e., retain aspect ratio)
4. Preference to resize ad     (i.e., squished larger or smaller)

← BACK — 121

NEXT → — 122
(i.e., calculate Unique Ads)

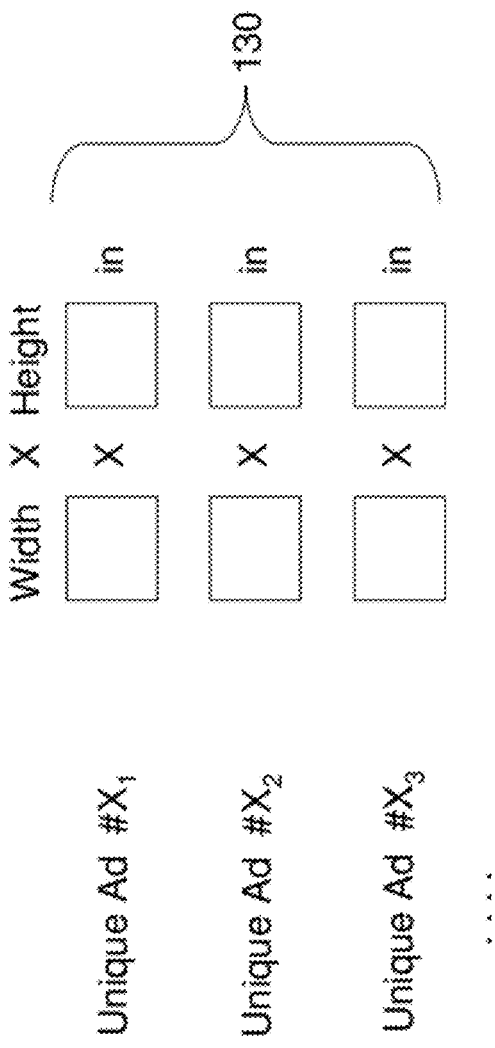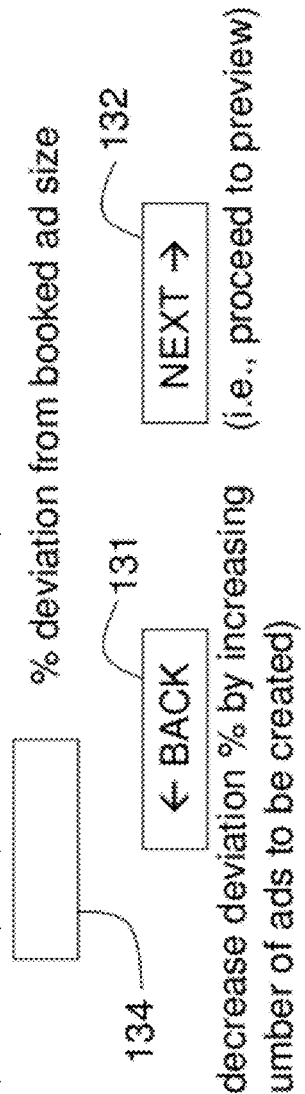
FIG. 1d

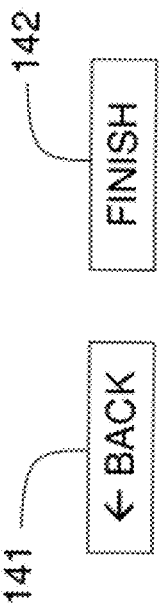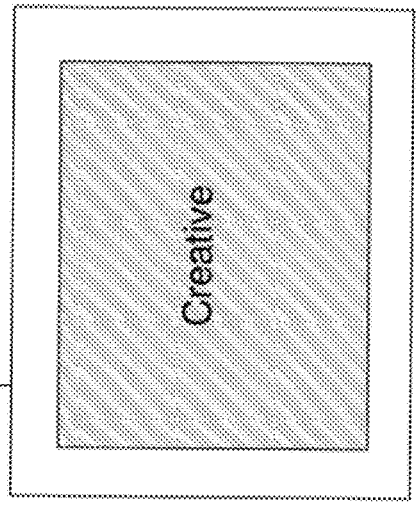
FIG. 1e

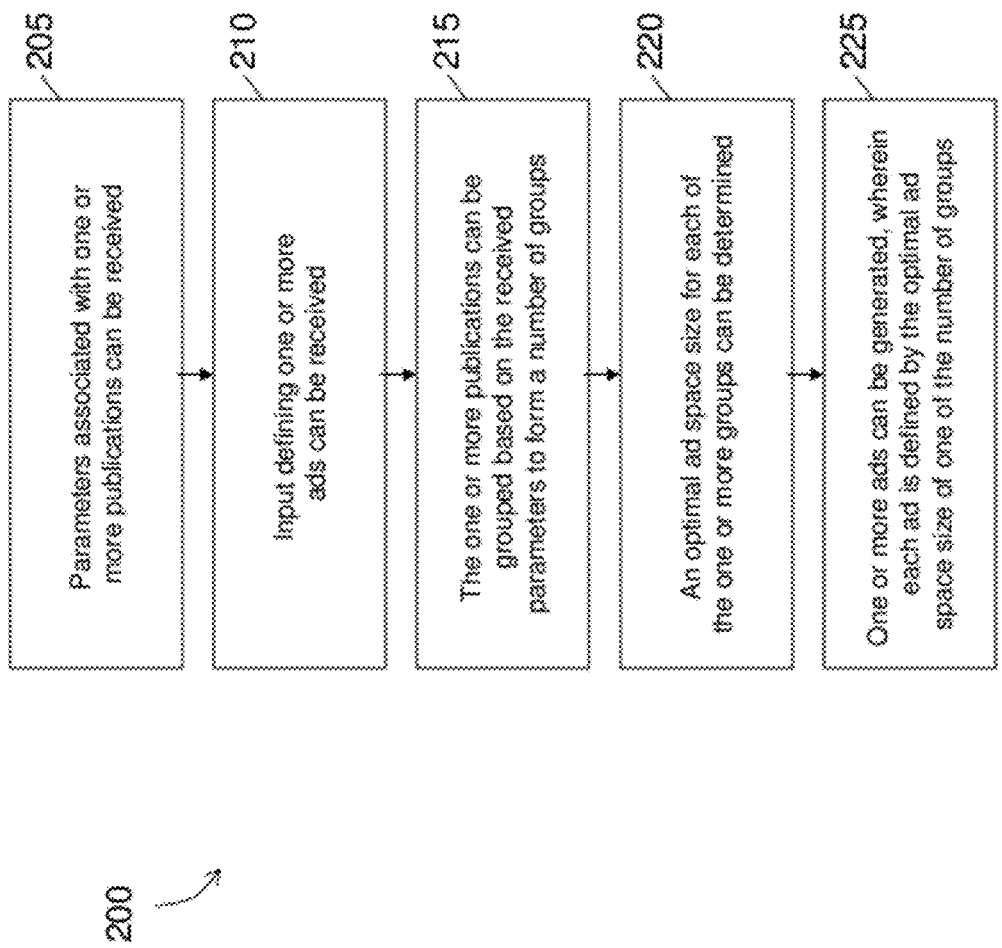

MINIMIZING AD PRODUCTION COSTS FOR PRINT ADVERTISERS

CROSS-REFERENCE TO RELATED APPLICATION

This application claims priority to pending U.S. Provisional Application Ser. No. 61/167,100, entitled "Minimizing Ad Production Costs for Print Advertisers", filed on Apr. 6, 2009, the entire contents of which are incorporated herein by reference.

TECHNICAL FIELD

The following disclosure relates to computer-implemented systems and techniques for minimizing ad production costs for print advertisers.

BACKGROUND

Advertisers can submit advertising copy (or "ad copy") to a publisher for inclusion in a printed publication, such as a newspaper or a magazine. Typically, the ad copy can be provided in the form of a proof, which presents the advertisement using the format in which the advertisement should be run. The proof can be in hard copy form or electronic form. The publisher can then manually process the proof to incorporate it into the printed publication.

An advertiser typically also specifies the placement of the ad copy in the printed publication, including parameters such as the edition in which the ad copy is to appear, the page on which the ad copy is to run, and the size of the advertisement. An advertiser also must determine what advertising space is available for a particular edition of a printed publication. Typically, an advertiser can interact with the publisher to determine the format of the printed publication and the advertisement sizes available. For example, the size of an advertisement can be expressed using a number of parameters, including the height and the width of one or more columns. The available advertising space can change between editions and also between sections of a single edition. If the ad copy supplied by the advertiser fails to satisfy one or more threshold criteria, the ad copy may not be included in the desired printed publication.

Once made, an offer to purchase advertising space in a printed publication is evaluated by the publisher to determine whether the ad copy will be accepted. Historically, advertisers negotiated terms directly with the publisher, such as through a sales representative. For example, a publisher could provide standard rates and terms for a particular publication. If an advertiser accepted those terms, the ad copy would be placed in the printed publication.

SUMMARY

This specification describes technologies relating to minimizing ad production costs for print advertisers. Ad production costs can be related to the number of advertisements that need to be created in an ad campaign. The present inventors recognized the need to develop an ad calculator to assist a designer make decisions regarding the optimal number, and optimal sizes, of advertisements needed in an ad campaign. The ad calculator can be implemented as a standalone client application or as an online, e.g., web-based, calculation tool that presents a user interface for calculating an optimum number of unique advertisements for an ad campaign.

The ad calculator, in one or more implementations, can include a graphical user interface that enables input of parameters associated with one or more publications, including acceptable ad space sizes. The ad calculator also can be implemented to receive input defining a maximum number of advertisements to be created for an ad campaign, a maximum deviation percentage between any advertisement and the booked ad space size of a publication, or both. The ad calculator also can be implemented to calculate optimal ad sizes for one or more unique advertisements to approximately fit ad space size dimensions associated with the one or more publications.

In one aspect, a computer-implemented method receives parameters associated with one or more publications. Input defining one or more ads is received. The one or more publications are grouped based on the received parameters to form a plurality of groups. A quantity of groups in the plurality of groups is based on the received input. An optimal ad space size for each of the plurality of groups is determined. The one or more ads are generated, wherein each ad is defined by the optimal ad space size of one or more of the plurality of groups.

This and other aspects can include one or more of the following features. At least one of the generated ads can be presented in a user interface. At least one of the generated ads can be compared to a largest ad space size of a corresponding group. The parameters associated with the one or more publications can define an ad space size of each publication. The ad space size can include an advertisement height and a width. Input defining a maximum deviation percentage can be received. The maximum deviation percentage can be the largest permissible difference between the parameters associated with the one or more publications and the one or more generated ads. An ad space size ratio can be determined, based on the received parameters, for each of the one or more publications. A common denominator can be determined for each of the ad space size ratios. Numerator values can be determined, based on the determination of the common denominator, for each of the ad space size ratios. The received parameters can be arranged numerically based on the numerator values. Groups of similar numerically arranged received parameters can be formed based on the received input.

The techniques described in this specification can be implemented to realize one or more of the following potential advantages. For example, the techniques can be implemented to reduce the amount of work necessary to create an ad campaign. In addition, the techniques can be implemented to minimize ad production costs by assisting designers make cost-efficient decisions regarding the number of advertisements needed in an ad campaign. Moreover, the techniques also can be implemented to quantitatively understand the impact of using a lesser number of advertisements than the number of publications in the ad campaign.

The techniques also can be implemented such that through a user interface wizard, a designer can calculate the sizes of one or more unique advertisements to be included in an ad campaign. In addition, the techniques can be implemented to graphically depict the unique advertisements in one or more user interfaces. The techniques also can be implemented to determine the percentage deviation between the unique advertisements and the ad space sizes of publications included in the ad campaign. Moreover, the techniques can be implemented such that through the user interface wizard a designer can decrease the percentage deviation by increasing the number of unique advertisements to be created. Furthermore, the techniques can be implemented to demonstrate the spatial arrangement of an unique advertisement positioned in an optimized ad space of a particular publication.

Details of one or more implementations are set forth in the accompanying drawings and the description below. Other aspects can be implemented in systems and computer program products, encoded on a computer-readable medium, operable to cause data processing apparatus to perform such operations. Other features, aspects, and advantages will become apparent from the description, the drawings, and the claims.

BRIEF DESCRIPTION OF THE DRAWINGS

FIGS. 1a-1e show exemplary steps of an ad calculator wizard.

FIG. 2 shows a flowchart of an example process for minimizing ad production costs for print advertisers.

Like reference symbols indicate like elements throughout the specification and drawings.

DETAILED DESCRIPTION

Figure 3:
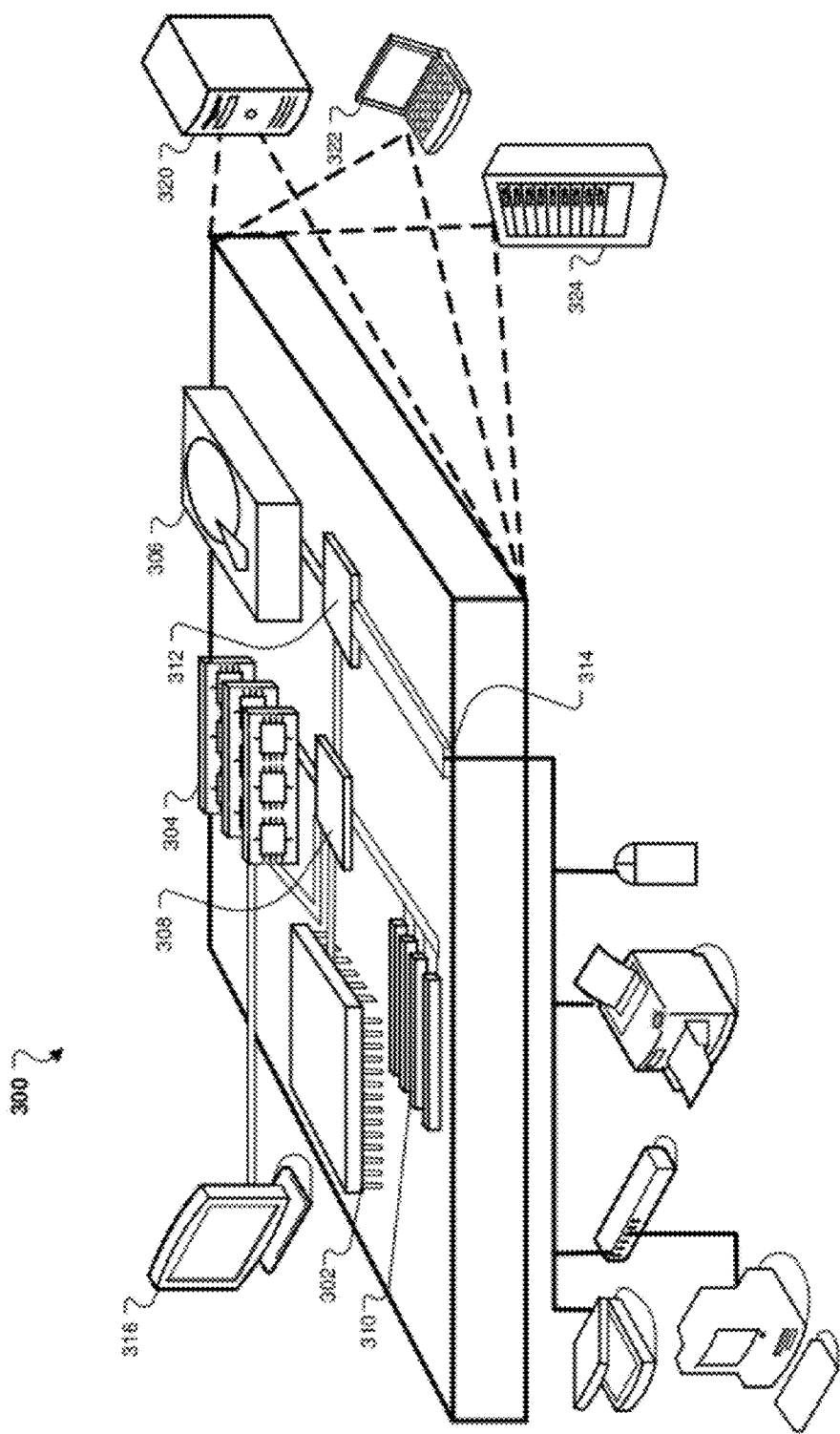
FIG. 3 shows a schematic diagram of an example computing device and system that can be used to implement the systems and methods described therein.

An ad calculator can be implemented to assist a user, e.g., designer, make decisions regarding the number of advertisements needed to fulfill an ad campaign. The ad campaign can include one or more publications configured to accept advertisements. The acceptable ad space sizes, i.e., the sizes of advertisements that can be accepted for inclusion in the one or more publications, can vary substantially from one publication to another. The ad calculator can be implemented as an online, e.g., web-based, ad calculator wizard for assisting a designer make decisions regarding an optimum number, and optimum sizes, of unique advertisements needed for a print advertising campaign. Alternatively, the ad calculator can be implemented as an ad calculator wizard provided by a software application installed on a computer system. The ad calculator wizard can be displayed in a graphical user interface.

FIG. 1a shows an example first step of an ad calculator wizard 100. A graphical user interface can be presented, which can include one or more prompts to specify parameters 105 associated with one or more publications. The parameters 105 can include the name of the one or more publications, and the acceptable ad space sizes for those publications. Ad size can be defined by the width of one or more columns and the height of an advertisement, with the dimensions expressed in a unit of measure, such as inches or centimeters. The width of one or more columns can be expressed as the column width.

A designer, can input the parameters 105 associated with the one or more publications into the one or more prompts in the graphical user interface. In some implementations, the graphical user interface prompts can include one or more data entry fields, radio buttons, checkboxes, sliders, or other such graphical user interface widgets for inputting the parameters 105. Alternatively, the parameters 105 can be input using one or more drop-down menus with pre-populated options. For example, a designer can select a pre-populated option from the drop-down menu corresponding to a particular column width and a particular advertisement height. An input device, e.g., a mouse, operatively coupled to a computer system in which the graphical user interface is installed can be used to select a pre-populated option from the drop-down menu. Additionally, a keyboard, a touchscreen, or both, can be used to select a pre-populated option from the drop-down menu corresponding to a particular column width and a particular advertisement height.

In some implementations, the parameters 105 can be input into the graphical user interface automatically. For example, the parameters 105 of the one or more publications can be input automatically from a Print Ads® account maintained by Google Inc. of Mountain View, Calif. The publications can be printed publications, such as newspapers or magazines. Alternatively, the publications can be electronic publications with a displayable area, such as web pages or electronic displays. In electronic publications, ad size can be expressed in a unit of measure, such as a number of pixels. In some implementations, ad size can be automatically converted from inches to pixels, and vice versa.

The parameters 105 of additional publications can be input into the graphical user interface by selecting an additional publications icon 106. Upon entering the parameters 105 associated with the one or more publications in the ad campaign, the next button 107 can be selected to proceed to the next step of the ad calculator wizard 100. The ad calculator wizard 100 also can be implemented to assist advertisers, media buyers and publishers make decisions regarding the optimum number, and the optimum sizes, of unique advertisements needed for a print advertising campaign.

FIG. 1b shows an example second step of an ad calculator wizard 100. In the second step of the ad calculator wizard 100, a number of advertisements 110 to be created for an ad campaign can be specified. The number of advertisements 110 can be input through one or more prompts in the graphical user interface. The number of advertisements 110 specified can express the maximum number of advertisements to be created for the ad campaign. The number of advertisements 110 can be input into the graphical user interface by a designer. Alternatively, the number of advertisements 110 can be input into the graphical user interface automatically. For example, the number of advertisements 110 to be created for an ad campaign can be input automatically from a Print Ads® account maintained by Google, Inc. of Mountain View, Calif. Each advertisement to be created for the ad campaign can be implemented as a unique advertisement with a unique ad size.

In some implementations, a designer can decide to create a fewer number of unique advertisements than the number of publications included in the ad campaign. Due to the varying ad space dimensions of the publications, when a unique advertisement is not exclusively tailored to each publication, the advertisement may not perfectly fit the dimensions of each publication. Thus, creating a fewer number of unique advertisements than the number of publications in the ad campaign can result in advertisements that require manipulation in order to perfectly fit the ad space sizes of the different publications. Advertisements configured to be smaller than the ad space size of a publication can be floated in the center of the ad space. As an alternative to floating, a unique advertisement can be proportionately increased in size, so long as the image resolution is not compromised, to perfectly fit an ad space. Conversely, a unique advertisement can be proportionately reduced, or scaled, in size to perfectly fit an ad space. The back button 111 can be selected to return to the first step of the ad calculator wizard 100, e.g., to alter the parameters 105 associated with the one or more publications. Similarly, the next button 112 can be selected to proceed to the next step of the ad calculator wizard 100.

FIG. 1c shows an example alternative second step of an ad calculator wizard 100. In an alternative second step of the ad calculator wizard 100, a maximum deviation percentage 120 can be specified. One or more maximum deviation percentages 120 can be input through one or more prompts in the graphical user interface. The maximum deviation percentage 120 can be configured to be the maximum difference between a unique advertisement and any dimension of the stated, or booked, publication ad space size. The deviation percentage between unique advertisements and acceptable publication ad sizes can be measured with respect to one of several dimensions, including height, width and diagonally.

By specifying the maximum deviation percentage 120, the ad calculator wizard 100 can determine the number of unique advertisements that need to be created such that the maximum permissible difference value for the ad space size dimensions is not exceeded. For example, the designer can specify that 10% is the maximum deviation percentage between any unique advertisement as compared to any booked ad height. In this example, a unique advertisement can be enlarged, scaled down, stretched, or shrunk, vertically, horizontally, diagonally, or by any combination of such, so long as the height of the unique advertisement remains within 10% of the booked ad space height for the publication. Based on the maximum deviation percentage 120, the ad calculator can determine the number, and sizes, of unique advertisements needed to fulfill the ad campaign.

The percentage deviation from one or more booked ad space size dimensions can be related to the number of advertisements created for the ad campaign. An increase in the number of unique advertisements created for the ad campaign can result in a decrease of the deviation percentage. The deviation percentage can result in a decrease because a greater number of unique advertisements will more closely fit the ad space size dimensions of the one or more publications. The back button 121 can be selected to return to the first step of the ad calculator wizard to, e.g., alter the parameters 105 associated with the one or more publications. Similarly, the next button 122 can be selected to proceed to the next step of the ad calculator wizard 100.

FIG. 1d shows an example third step of an ad calculator wizard 100. In the third step of the ad calculator wizard 100, ad dimensions 130 of the one or more unique advertisements to be created for the ad campaign can be presented. The ad dimensions 130 can be presented in the graphical user interface. The ad dimensions 130 can include one or more dimensions, including a width and a height of each unique advertisement to be created for the ad campaign. An unique advertisement indicator 133 can be implemented to indicate the optimum number of unique advertisements that need to be created. The unique ad indicator 133 can be linked to the input specifying the number of advertisements 110 in the first step of the ad calculator wizard 100.

In some implementations, based on the input specified in the second, or alternative second, step of the ad calculator wizard 100, a maximum deviation percentage indicator 134 can be presented in the graphical user interface. The maximum deviation percentage indicator 134 can be implemented with respect to one or more ad space size dimensions. The back button 131 can be selected to return to the second, or alternative second, steps of the ad calculator wizard 100 to, e.g., alter the maximum number of advertisements 110 to be created, or the maximum deviation percentage 120, respectively. Similarly, the next button 132 can be selected to proceed to the next step of the ad calculator wizard 100.

FIG. 1e shows an example fourth step of an ad calculator wizard 100. In the fourth step of the ad calculator wizard 100, one or more unique advertisement previews 140 can be presented in the graphical user interface. The one or more unique advertisement previews 140 can be presented in a print preview implementation as one or more graphical images. The graphical images can depict the calculated optimal sizes of one or more unique advertisements based on the inputs specified in the previous steps of the ad calculator wizard 100. The unique advertisement preview 140 can be implemented to compare an optimized unique advertisement with one or more ad space dimensions in a publication. In some implementations, the compared ad space dimensions can be configured to represent the largest ad space size for a particular grouping of one or more similarly sized publications. In some other implementations, the unique advertisement preview 140 can be configured to include the textual and graphical images of the ad copy submitted for inclusion in the ad campaign.

A unique advertisement can be altered by changing one or more dimensions of the advertisement in the unique advertisement preview 140. In some implementations, a maximum deviation percentage indicator can be included in the graphical user interface to indicate the change in deviation percentage due to altering the one or more unique advertisements in the unique advertisement preview 140. One or more unique ad labels 143 can be selected to present the associated unique advertisement preview 140 in the graphical user interface. The back button 141 can be selected to return to the third step of the ad calculator wizard 100. Alternatively, the finish button 142 can be selected to store the optimally calculated unique advertisements. The unique advertisements can be stored in a storage device, a results database, or both. The results database can be implemented as an online, e.g., web-based, storage database maintained by Google Inc. of Mountain View, Calif.

FIG. 2 shows a flowchart of an example process 200 for minimizing ad production costs for print advertisers. The process 200 can, for example, be implemented in the ad calculator wizard 100 depicted in FIGS. 1a-1e.

Parameters associated with one or more publications can be received (205). The parameters can be received through one or more prompts in a graphical user interface. The parameters associated with the one or more publications can include publication names, and the ad sizes accepted for inclusion in the respective publications. The parameters can be received manually, automatically, or by a combination of both. The one or more publications can include printed publications, such as magazines or newspapers. Alternatively, the one or more publications can include electronic publications with displayable areas, such as a web page or electronic display.

Input defining one or more ads can be received (210). The input defining the one or more ads can be received through one or more prompts in a graphical user interface. The input can be received manually, automatically, or by a combination of both. The input defining the one or more ads can specify the maximum number of advertisements to be created for an ad campaign. In some implementations, input defining a maximum deviation percentage for the one or more ads as compared to the parameters associated with the one or more publications also can be received.

The one or more publications can be grouped based on the received parameters to form a number of groups (215). The groups can be formed based on the input defining the one or more ads. The groups can be formed by determining the height-to-width ratio, based on the received parameters, for each ad space size configured to accept an advertisement in the ad campaign. The height can be configured to be the numerator and the width can be configured to be the denominator, and vice versa. An ad calculator can determine a common denominator for each of the height-to-width ratios. Based on the determination of the common denominator, i.e., the multiplication or division factor used to generate the common denominator, numerator values for each of the height-to-width ratios can be determined. The received parameters, i.e., ad space sizes, can then be arranged numerically, i.e., from smallest to largest, or vice versa, based on the numerator values. Ad space sizes having similarly defined numerator values can be grouped together. An ad calculator can form a number of groups based on the input defining the one or more ads. For example, when the maximum number of ads to be created is specified as three, the ad calculator can form three groups of publications, each group having similar ad space sizes. In some implementations, the grouping can be based on obtaining the minimum percentage deviation between publication ad space sizes within the group.

An optimal ad space size of each of the one or more groups can be determined (220). The optimal ad space size of each of the one or more groups can be determined by an ad calculator. The ad calculator can be implemented as an online calculation tool or as a software application having a graphic user interface. The optimal ad space size can be calculated as the smallest common ad space size in a group. For example, the optimal ad space size of the following group having publication ad spaces sizes of: 3" width×4" height; 4" width×5" height; 3.5" width×4.5" height, is 3"×4".

One or more ads can be generated, wherein each ad is defined by the optimal ad space size of one of the number of groups (225). Each of the generated ads can be defined by the smallest common ad space size for a respective group. When, for example, five ads are specified to be created, five groups of publications having similar ad space sizes can be formed, and the optimal ad space size for each group can be determined. The generated ads can be implemented to approximately fit the optimal ad space size determined for each of the groups, respectively. The one or more generated ads can be presented in a print preview format in a graphic user interface. The one or more generated ads also can be compared to the largest ad space size of a publication in its corresponding group. Alternatively, the one or more generated ads can be compared to the determined optimal ad space size of the corresponding group. In some implementations, the one or more ads can be manipulated, i.e., enlarged, shrunk, squeezed or stretched. The manipulated ads can be configured to retain a particular aspect ratio, or alternatively, to disregard a particular aspect ratio.

FIG. 3 shows a schematic diagram of an example computing device and system that can be used to implement the systems and methods described therein. Computing device 300 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various buses, and can be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high speed interface 308. Multiple processors and/or multiple buses can be used, as appropriate, along with multiple memories and types of memory. Also, multiple computing devices 300 can be connected, with each device providing portions of the necessary operations, e.g., as a server bank, a group of blade servers, or a multi-processor system.

The memory 304 stores information within the computing device 300. The memory 304 can be a computer-readable medium. The memory 304 can be a volatile memory unit or units. The memory 304 can be a non-volatile memory unit or units.

The storage device 306 is capable of providing mass storage for the computing device 300. The storage device 306 can be a computer-readable medium. The storage device 306 also can be a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can contain instructions that, when executed, perform one or more methods, such as those described above. The information carrier can be a computer- or machine-readable medium, such as the memory 304, the storage device 306, memory on processor 302, or a propagated signal.

The high speed controller 308 can manage bandwidth-intensive operations for the computing device 300, while the low speed controller 312 can manage lower bandwidth-intensive operations. Such allocation of duties is exemplary only. The high-speed controller 308 can be coupled to memory 304, display 316 (e.g., through a graphics processor or accelerator), and to high-speed expansion ports 310, which can accept various expansion cards (not shown). The low-speed controller 312 can be coupled to storage device 306 and low-speed expansion port 314. The low-speed expansion port 314, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 300 can be implemented in a number of different forms, as shown in the figure. For example, it can be implemented as a standard server 320, or multiple times in a group of such servers. It can also be implemented as part of a rack server system 324. In addition, it can be implemented in a personal computer such as a laptop computer 322.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "information carrier" comprises a "machine-readable medium" that includes any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal, as well as a propagated machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The subject matter described herein can be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

A number of implementations have been disclosed herein. Nevertheless, it will be understood that various modifications can be made without departing from the spirit and scope of the claims. For example, the actions recited in the claims can be performed in a different order and still achieve desirable results. Accordingly, other implementations are within the scope of the following claims.

What is claimed is:

1. A computer-implemented method for calculating ad sizes, the method comprising:
  receiving parameters associated with one or more publications;
  receiving input defining a maximum deviation percentage, wherein the maximum deviation percentage comprises a largest permissible difference between the received parameters associated with the one or more publications and an ad space size of one or more ads;
  grouping the one or more publications based on the received parameters to form a plurality of groups, wherein a quantity of groups in the plurality of groups is based on the received input;
  determining an optimal ad space size for each of the plurality of groups; and
  generating one or more ads, wherein each generated ad is defined by the optimal ad space size of one or more of the plurality of groups.

2. The method of claim 1, further comprising presenting at least one of the generated ads in a user interface.

3. The method of claim 2, wherein the presenting further comprises:
  comparing the at least one of the generated ads to a largest ad space size of a corresponding group.

4. The method of claim 1, wherein the parameters associated with the one or more publications defines an ad space size of each publication.

5. The method of claim 4, wherein the ad space size of each publication includes an advertisement height and a width.

6. The method of claim 1, wherein grouping the one or more publications based on the received parameters further comprises:
  determining an ad space size ratio, based on the received parameters, for each of the one or more publications;
  determining a common denominator for each of the ad space size ratios;
  determining numerator values, based on the determination of the common denominator, for each of the ad space size ratios;
  arranging the received parameters numerically, based on the numerator values; and
  forming groups, based on the received input, of similar numerically arranged received parameters.

7. A computer program product, encoded on a computer-readable medium, operable to cause data processing apparatus to perform operations comprising:
  receiving parameters associated with one or more publications;
  receiving input defining a maximum deviation percentage, wherein the maximum deviation percentage comprises a largest permissible difference between the received parameters associated with the one or more publications and an ad space size of one or more ads;
  grouping the one or more publications based on the received parameters to form a plurality of groups, wherein a quantity of groups in the plurality of groups is based on the received input;
  determining an optimal ad space size for each of the plurality of groups; and
  generating one or more ads, wherein each generated ad is defined by the optimal ad space size of one or more of the plurality of groups.

8. The computer program product of claim 7, further comprising presenting at least one of the generated ads in a user interface.

9. The computer program product of claim 8, wherein the presenting further comprises:
  comparing the at least one of the generated ads to a largest ad space size of a corresponding group.

10. The computer program product of claim 7, wherein the parameters associated with the one or more publications defines an ad space size of each publication.

11. The computer program product of claim 10, wherein the ad space size of each publication includes an advertisement height and a width.

12. The computer program product of claim 7, wherein grouping the one or more publications based on the received parameters further comprises:
  determining an ad space size ratio, based on the received parameters, for each of the one or more publications;
  determining a common denominator for each of the ad space size ratios;
  determining numerator values, based on the determination of the common denominator, for each of the ad space size ratios;

arranging the received parameters numerically, based on the numerator values; and forming groups, based on the received input, of similar numerically arranged received parameters.

13. A system comprising:

a processor; and a computer readable medium storing a computer program for calculating ad sizes, the computer program comprising instructions to cause the processor to perform operations comprising:

receiving parameters associated with one or more publications;

receiving input defining a maximum deviation percentage, wherein the maximum deviation percentage comprises a largest permissible difference between the received parameters associated with the one or more publications and an ad space size of one or more ads;

grouping the one or more publications based on the received parameters to form a plurality of groups, wherein a quantity of groups in the plurality of groups is based on the received input;

determining an optimal ad space size for each of the plurality of groups; and generating one or more ads, wherein each generated ad is defined by the optimal ad space size of one or more of the plurality of groups.

14. The system of claim 13, the operations further comprising presenting at least one of the generated ads in a user interface.

15. The system of claim 14, wherein the presenting further comprises:

comparing the at least one of the generated ads to a largest ad space size of a corresponding group.

16. The system of claim 13, wherein the parameters associated with the one or more publications defines an ad space size of each publication.

17. The system of claim 16, wherein the ad space size of each publication includes an advertisement height and a width.

18. The system of claim 13, wherein grouping the one or more publications based on the received parameters further comprises:

determining an ad space size ratio, based on the received parameters, for each of the one or more publications;

determining a common denominator for each of the ad space size ratios;

determining numerator values, based on the determination of the common denominator, for each of the ad space size ratios;

arranging the received parameters numerically, based on the numerator values; and forming groups, based on the received input, of similar numerically arranged received parameters.

* * * * *